United States Patent [19]
Castleberry

[11] Patent Number: 4,688,896
[45] Date of Patent: Aug. 25, 1987

[54] INFORMATION CONVERSION DEVICE WITH AUXILIARY ADDRESS LINES FOR ENHANCING MANUFACTURING YIELD

[75] Inventor: Donald E. Castleberry, Schenectady, N.Y.

[73] Assignee: General Electric Company, Schenectady, N.Y.

[21] Appl. No.: 707,996

[22] Filed: Mar. 4, 1985

[51] Int. Cl.$^4$ .............................................. G01C 11/06
[52] U.S. Cl. ..................................... 350/333; 340/284
[58] Field of Search ................................ 350/332–335; 358/256; 365/63, 64, 72, 149, 189; 340/784, 765

[56]  References Cited
U.S. PATENT DOCUMENTS
4,368,523  1/1983  Kawate ................................. 365/63

OTHER PUBLICATIONS

Y. Rytz-Froidevaux et al., "Cadmium Deposition on Transparent Substrates by Laser Induced Dissociation of Cd (CH$_3$)$_2$ at Visible Wavelengths," Applied Physics A, vol. A 27 (1982), pp. 133–138.

Primary Examiner—Arthur G. Evans
Attorney, Agent, or Firm—Robert Ochis; James C. Davis, Jr.; Marvin Snyder

[57]  ABSTRACT

An enhanced manufacturing yield of a high resolution, high accuracy information conversion device, such as a liquid crystal display, is attained through incorporation into the device of auxiliary address lines. Such auxiliary address lines are used to provide electrical communication with portions of main address lines that, due to the presence of electrical open circuits, would otherwise be electrically isolated. Each auxiliary address line crosses over multiple main address lines and can be electrically shorted to any such main address line to provide electrical communication therewith. The ratio of auxiliary address lines to main address lines is accordingly low, such as 1:10 or less, for example.

13 Claims, 4 Drawing Figures

INFORMATION CONVERSION DEVICE WITH AUXILIARY ADDRESS LINES FOR ENHANCING MANUFACTURING YIELD

BACKGROUND OF THE INVENTION

The present invention relates to devices that convert information from one form to another, such as from electrical to optical form as in a liquid crystal display, for example, and, more particularly, relates to the provision of auxiliary address lines in information conversion devices that result in enhancement of the manufacturing yield of such devices.

Information conversion devices, such as liquid crystal displays, are typically arranged as a multiplicity of cells assembled in an X-Y matrix format. A plurality of X address lines is provided for electrically communicating with "X" locations of the device, while a plurality of Y address lines are provided for electrically communicating with "Y" locations of the device. A particular location in an information conversion device may be communicated with by use of the particular X and Y address lines that are associated with the location in question.

In the fabrication of information conversion devices, the occurrence of an address line that is open circuited is extremely difficult to avoid. Accordingly, some portion of the address line in which an open circuit exists is electrically isolated from external circuitry, whereby the device cells associated with such isolated portion fail to function properly. Cell failure adversely affects performance of an information conversion device by decreasing device resolution and resulting in false data generation. To minimize cell malfunctioning due to the presence of open circuits in address lines, it would be desirable to provide auxiliary address lines that may be electrically connected to portions of address lines that are otherwise in electrical isolation. This would permit normal operation of the cells associated with an otherwise isolated portion of an address line. As a consequence, the manufacturing yield of information conversion devices that exhibit high resolution and accurate data representation would be attained.

SUMMARY OF THE INVENTION

Accordingly, it is an object of the invention to provide a high resolution, high accuracy information conversion device of enhanced manufacturing yield.

It is a further object of the invention to provide an information conversion device of enhanced manufacturing yield that may be economically made.

It is yet another object of the invention to provide an information conversion device of enhanced manufacturing yield that may be fabricated with standard fabrication equipment.

The foregoing and further objects of the invention are realized, in preferred form, in an information conversion device of the type including a plurality of information-conversion cells arranged in an X-Y matrix format. The device includes a plurality of main X address lines of electrically conductive material, and a plurality of main Y address lines of electrically conductive material, with the main X address lines and the main Y address lines being oriented transverse to each other within a device area that is addressable by said main X and Y address lines. The device further includes at least one auxiliary X address line of electrically conductive material and at least one auxiliary Y address line of electrically conductive material. The auxiliary X address line crosses over at least one of the main X address lines and is adapted to be electrically shorted to such main X address line if required. The auxiliary Y address line crosses over at least one of the main Y address lines and is adapted to be electrically shorted to such main Y address line if required.

The auxiliary X address lines and auxiliary Y address lines are preferably located outside of the addressable area of the information conversion device so as to avoid impairment of device resolution. However, since an auxiliary address line may be electrically shorted to any of the main address lines that it crosses over, only relatively few auxiliary lines are needed and can be interspersed with main address lines in the addressable area of the device without a severe degree of degradation in device resolution.

BRIEF DESCRIPTION OF THE DRAWINGS

While the specification concludes with claims defining the features of the invention that are regarded as novel, it is believed that the invention, together with further objects thereof, will be better understood from the following description in conjunction with the drawing figures, in which:

DETAILED DESCRIPTION OF THE PREFERRED EMBODIMENTS

Figure 1:
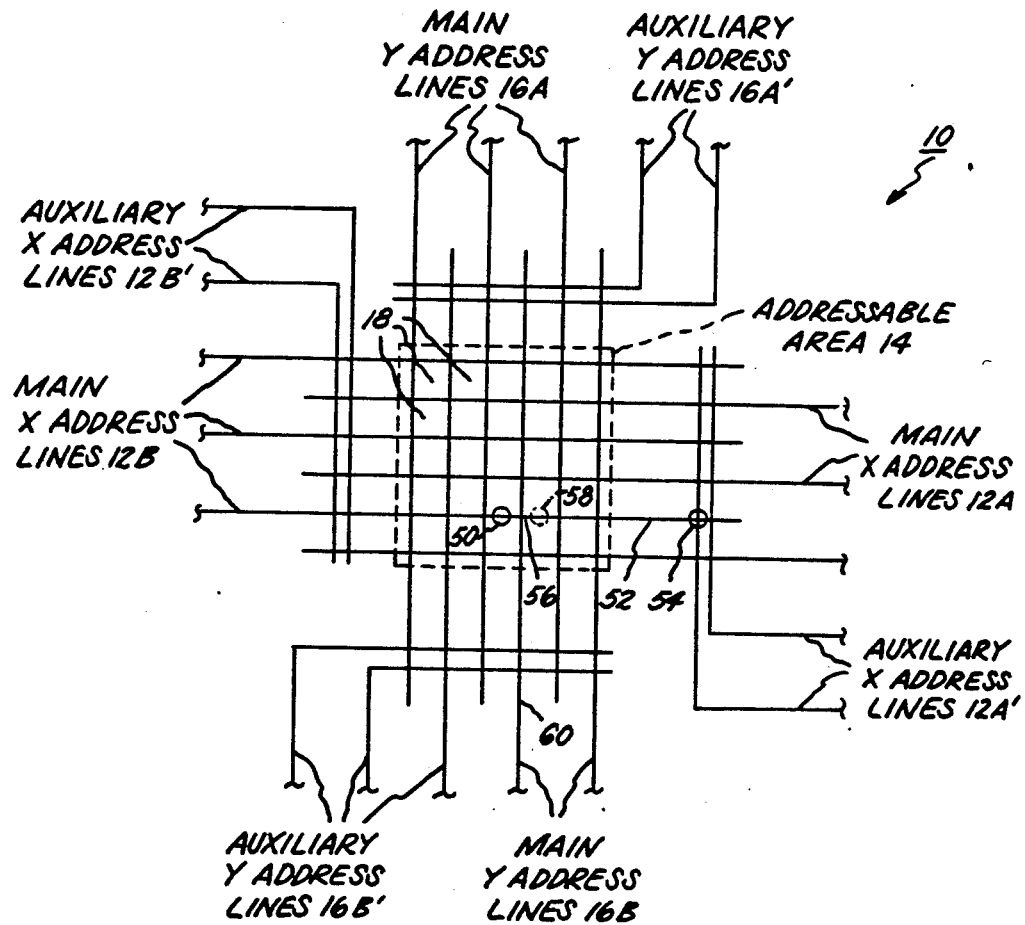
FIG. 1 is a simplified, top plan view of an address line arrangement for an information conversion device, in accordance with the invention.

FIG. 1 depicts in simplified form an electrode or "line" arrangement 10 that may be advantageously incorporated into an information conversion device (not shown) to convert electrical information to optical information, by way of example. Line arrangement 10 includes main X address lines 12A and main X address lines 12B that are preferably interdigitated with each other, as shown. Address lines 12A and 12B extend from an addressable area 14 (shown with a dash line boundary) outwardly from such area 14 to electrical circuitry (not shown) that may supply address lines 12A and 12B with electrical signals or, instead, sense the electrical condition of such lines. Similarly, line arrangement 10 includes main Y address lines 16A and main Y address lines 16B, which are preferably interdigitated with each other as shown. The number of main X address lines 12A and 12B, as well as the number of main Y address lines 16A and 16B, are each typically on the order of 100, with 400 being a preferred value for a liquid crystal display application with an addressable area of 4 inches by 4 inches.

Within addressable area 14 of line arrangement 10 are a plurality of information-conversion cells 18 arranged in an X-Y matrix format. Cells 18 are shown simply as squares in the simplified view of FIG. 1. A more detailed view of an information-conversion cell 18 appears in FIG. 2. In the schematic view of FIG. 2, it can be seen that X address lines 12A and 12B are electrically isolated from Y address lines 16A and 16B. A liquid crystal element 20, or other information conversion element, is shown as electrically connected between a switching element 202 and a reference or ground potential point 204. Liquid crystal element 200 is represented as a capacitor in accordance with a primary electrical characteristic of a liquid crystal element. As is known in the art, a liquid crystal element constitutes a passive transmitter of light generated from an independent light source, and in this respect, is similar to the shutter of a photographic camera. The invention is not limited to the use of liquid crystal element 200 however. Alternatives to liquid crystal element 200 comprise other passive transmitters of light, such as electrochromatic or electrophoretic material. A still further alternative to liquid crystal element 200 comprises an active generator of light, such as a light emitting diode or other electroluminescent material. A further alternative comprises an electrically-responsive sensor of light, such as an X-ray scintillator. As a still further alternative to liquid crystal element 200, an element that converts electrical information to mechanical information, or vice-versa, such as a piezoelectric element, could be used in lieu of liquid crystal element 200.

Figure 2:
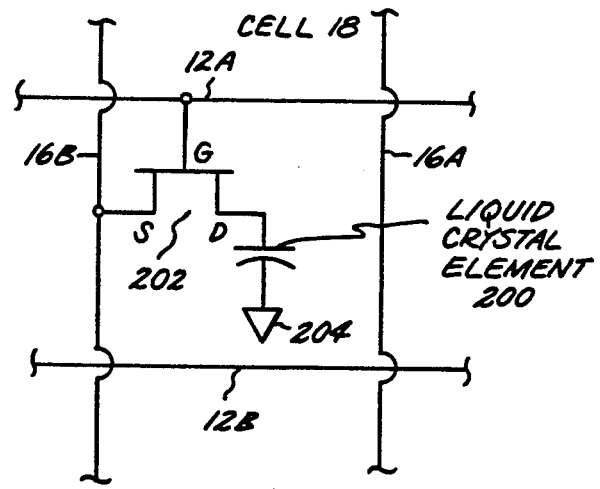
FIG. 2 is a detail view of a portion of the address line arrangement of FIG. 1 that additionally illustrates further features of an information conversion device.

Switching device 202 of FIG. 2 may comprise a field-effect transistor (FET) as illustrated, preferably being of the amorphous silicon type. FET 202 includes a gate electrode G connected to X address line 12A, a source electrode S connected to Y address line 16B and a drain electrode D connected to liquid crystal element 200. As will be appreciated by those skilled in the art, liquid crystal element 200 is electrically connected via FET 202 to Y address line 16B whenever gate G of FET 202 is provided via X address line 12A with an appropriate electrical gating signal to render FET 202 conductive between its source S and drain D electrodes. While only a single FET 202 has been illustrated within information conversion cell 18, an additional FET or FETs may be included in cell 18 to provide redundancy in the event that one or more of the FETs is defective.

Referring again to FIG. 1, line arrangement 10 includes auxiliary X address lines 12A' and 12B' and also auxiliary Y address lines 16A' and 16B'. Auxiliary X address lines 12A' cross over main X address lines 12A and 12B and are adapted to be electrically shorted to one of main X address lines 12A or 12B. Similarly, auxiliary X address lines 12B' bear a similar "cross over" relation to main X address lines 12A and 12B, and the same holds true for the grouping of Y address lines 16A' and 16A and 16B, and for the further grouping 16B' and 16A and 16B. (The term "cross over" and its variants are used herein in a broad sense and simply refer to a transverse relationship of address lines without regard to the vertical level of the lines that cross over each other.) The number of auxiliary address lines 12A' and 12B' may vary from that shown, and depends upon the likelihood of defects in the main X and Y address lines in line arrangement 10. The following example addresses the preferred relationship between the number of auxiliary address lines and the number of main address lines in a line arrangement.

A typical line arrangement for a liquid crystal display, by way of example, comprises an X-Y matrix of 400 main X address lines and 400 main Y address lines, with each address line having a width of about 10 micrometers. To provide adequate protection for such an X-Y matrix display, it has been found that the ratio of the number of auxiliary address lines to the number of main address lines is preferably 1:10 or less.

As the foregoing example indicates, the ratio of auxiliary address lines to main address lines can be relatively low. This beneficially reduces the device area occupied by the auxiliary lines. Accordingly, when auxiliary lines are placed in the addressable area of a device (e.g., area 14 in FIG. 1), the resolution of the device is not severely diminished. With the auxiliary address line outside of the addressable area of a device, maximum device resolution is achieved. A further beneficial feature of the invention is that the auxiliary lines can be economically realized, since they can be formed in the same fabricated step as used to form the main address lines. Related to this feature is the still further beneficial feature that standard fabrication equipment can be used to form the auxiliary address lines, as well as the main address lines.

The auxiliary address lines of the present invention may be utilized in the following manner to provide an electrical connection to a main address line that becomes electrically isolated from the associated circuitry (not shown) which drives the line or senses the electrical condition of the line. For example, if lowermost-illustrated main X address line 12B becomes open circuited at location 50 (indicated schematically by a circle), then leftmost-illustrated auxiliary X address line 12A' (or rightmost line 12A') may be electrically shorted to the otherwise-isolated portion 52 of main X address line 12B. Such electrical shorting is illustrated schematically at crossover location 54 (by a circle) between the otherwise-isolated portion 52 and the leftmost-illustrated auxiliary X address line 12A'. Procedures for implementing the electrical short at crossover location 54 are addressed below.

The open circuit at location 50 in the lowermost-illustrated main X address line 12B may be unintentionally created due to imperfections in fabrication procedure that are difficult to avoid. For example, contaminants may be present during the process for forming line arrangement 10 and result in an open circuit such as that at location 50. Alternatively, open circuits such as that at location 50 may be intentionally created by the known technique of laser evaporation, for example, in order to isolate an electrical short between a main X address line and a main Y address line. By way of example, if an electrical short is present at location 56 (i.e., between a main Y address line 16B and a main X address line 12B), an open circuit may be intentionally created at location 50 as well as at location 58 (schematically shown by a circle in phantom) to isolate the short at location 56 on main Y address line 60. In this circumstance, the leftmost-illustrated auxiliary X address line 12A' (or rightmost line 12A') may be used as described above to provide electrical interconnection to the otherwise-isolated portion 52 of lowermost-illustrated main X address line 12B.

Figure 3A:
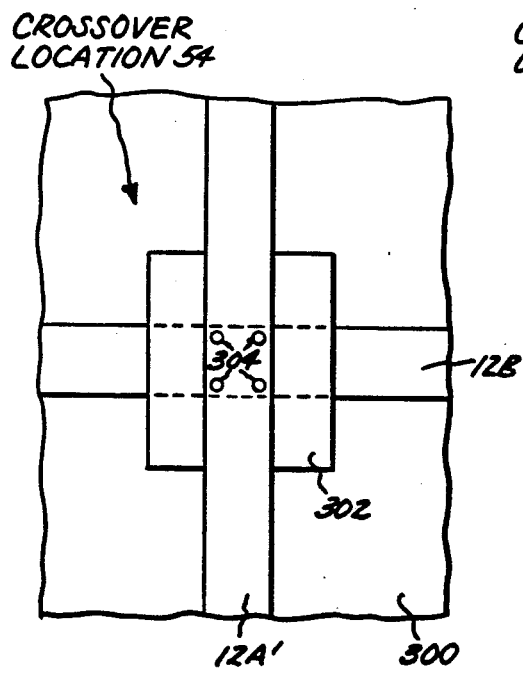
FIGS. 3A and 3B are schematic, top plan views of a crossover point between auxiliary and main address lines and illustrate preferred techniques for electrically shorting together such lines.

A first preferred technique of electrically shorting an auxiliary address line to a main address line is depicted in FIG. 3A, representing a portion of address line arrangement 10 of FIG. 1. Illustrated in simplified, top plan view in FIG. 3A are a main X address line 12B and an auxiliary X address line 12A', with the auxiliary line crossing over the main line at crossover location 54. A substrate 300 supports main and auxiliary address lines 12B and 12A', respectively. An insulating layer 302 is used to dielectrically separate auxiliary line 12A' from main line 12B. However, when it is desired to electrically short together the auxiliary and main lines 12A' and 12B, respectively, the dielectric separation function performed by insulating layer 302 is no longer required.

To electrically short together auxiliary and main lines 12A' and 12B, respectively, laser pulses are directed at the four locations 304 (schematically depicted as circles) on auxiliary line 12A'. A single laser pulse at each of locations 304 has been found suitable to achieve electrical shorting of auxiliary and main lines 12A' and 12B, respectively, although pulses at fewer locations should also be adequate. The precise interaction of a laser pulse with lines 12A' and 12B and insulating layer 302 is not fully understood. However, such understanding is not necessary in order to practice the present invention. By way of example, to electrically short auxiliary address line 12A' of molybdenum to a main address line 12B of titanium, where insulating layer 302 comprises a 1,500 angstrom sublayer of silicon nitride overlain by a 2,500 angstrom sublayer of amorphous silicon, a pulse of 1 microsecond from a pulsed Xenon laser with an energy per pulse of 0.1 millijoules for each of locations 304 has been found to be suitable.

Figure 3B:
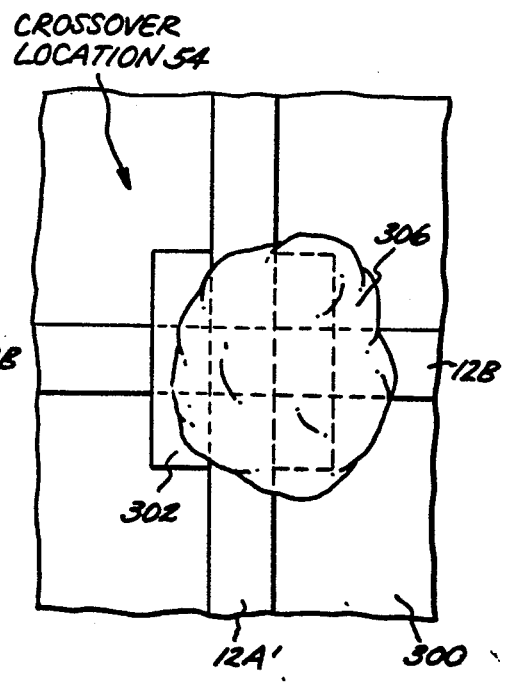

An alternative technique of electrically shorting together auxiliary and main address lines 12A' and 12B is depicted in FIG. 3B, which is similar to FIG. 3A. An electrical shorting (i.e., conducting) medium 306, such as conductive epoxy, is applied to auxiliary and main address lines 12A' and 12B, respectively, over insulating layer 302, so as to electrically short the lines together. By way of example, a suitable conductive paste for forming electrical shorting medium 306 is epoxy or paint filled with silver particles. Alternatively, electrical shorting medium 306 may comprise a heat-deposited metal formed, for example, through the action of a laser pulse directed towards the desired location for shorting medium 306 when the address line structure of FIG. 3B is exposed to an organometallic reagent, such as dimethyl cadmium. This latter technique of heat-activated metal deposition is known in the art and is described, for example, in an article by Y. Rytz-Froidevaux et al., entitled "Cadmiun Deposition on Transparent Substrates by Laser Induced Dissociation of $Cd(CH_3)_2$ at Visible Wavelengths", *Applied Physics A* Vol. A 27 (1982), pages 133–138.

The foregoing describes high resolution, high accuracy information conversion devices of enhanced manufacturing yield. The devices may be economically fabricated with standard fabrication equipment.

While the invention has been described with respect to specific embodiments, many modifications and substitutions will occur to those skilled in the art. It is, therefore, to be understood that the appended claims are intended to cover all such modifications and substitutions as fall within the true spirit and scope of the invention.

What is claimed as the invention and desired to be secured by Letters Patent of the United States is:

1. An information conversion device comprising:
   (a) a plurality of information-conversion cells arranged in X-Y matrix format;
   (b) a plurality of main X address lines of electrically conductive material;
   (c) a plurality of main Y address lines of electrically conductive material;
   (d) each of said cells being connected to a single main X address line and a single main Y address line with the specific main X address line and the specific main Y address line depending upon the location of said each of said cells in the matrix, so as to exhibit a unique address;
   (e) said main X address lines and said main Y address lines being oriented transverse to each other in a device area wherein said cells are electrically addressable by said main X address lines and said main Y address lines; and
   (f) at least one auxiliary X address line of electrically conducting material;
   (g) said auxiliary X address line crossing over at least one of said main X address lines in electrically insulated relation thereto and adapted to be permanently electricaly shorted to one of said main X address lines.

2. An information conversion device comprising:
   (a) a plurality of information-conversion cells arranged in X-Y matrix format and each including a respective liquid crystal display element;
   (b) a plurality of main X address lines of electrically conductive material;
   (c) a plurality of main Y address lines of electrically conductive material;
   (d) each of said cells being connected to a single main X address line and a single main Y address line with the specific main X address line and the specific main Y address line depending upon the location of said each of said cells in the matrix, so as to exhibit a unique address;
   (e) said main X address lines and said main Y address lines being oriented transverse to each other in a device area wherein said cells are electrically addressable by said main X address lines and said main Y address lines; and
   (f) a plurality of auxiliary X address lines of electrically conductive material;
   (g) said plurality of auxiliary X address lines crossing over at least one of said main X address lines in electrically insulated relation thereto at a location outside of said addressable area and adapted to be permanently electrically shorted to said one of said main X address lines.

3. The information conversion device of claim 1, wherein the ratio of the number of auxiliary X address lines to the number of main X address lines has a maximum value of 1:10.

4. The information conversion device of claim 1, further including an insulating layer at the crossover location between said auxiliary X address line and said main X address line, the thickness of said insulating layer being sufficiently low that a laser pulse of predetermined energy directed at said crossover location is effective to electrically short together said auxiliary X address lne and said main X address line.

5. The information conversion device of claim 1, further including an insulating layer at the crossover location between said auxiliary X address line and said main X address line, the thickness of said insulating layer being sufficiently low that a laser pulse of less than about 0.1 millijoules directed at said crossover point is effective to electrically short together said auxiliary X address line and main X address line.

6. The information conversion device of claim 2 wherein:
   a predetermined one of said X auxiliary address lines is permanently shorted to a predetermined one of the main X address line it crosses.

7. The information conversion device of claim 1, wherein each of said plurality of information conversion cells comprises a respective liquid crystal display element.

8. The information conversion device of claim 7, wherein each of said plurality of information conversion cells includes at least one field-effect transistor connected between respective ones of said main X and Y address lines and said liquid crystal display element.

9. The information conversion device of claim 1, further comprising at least one auxiliary Y address line of electrically conductive material, said auxiliary Y address line crossing over at least one of said main Y address lines in electrically insulated relation thereto and adapted to be permanently electrically shorted to said one of said main Y address lines.

10. The information conversion device of claim 9 wherein:
   said X auxiliary address line is permanently shorted to a predetermined one of said main X address lines it crosses.

11. The information conversion device of claim 1 wherein each of said plurality of information conversion cells includes at least one respective field-effect transistor connected between respective ones of said main X and Y address lines and a respective liquid crystal display element.

12. The information conversion device of claim 2, further including at least one auxiliary Y address line of electrically conductive material, said auxiliary Y address line crossing over at least one of said main Y address lines in electrically insulated relation thereto at a location outside of said addressable area and adapted to be permanently electrically shorted to said one of said main Y address lines.

13. The information conversion device of claim 9, wherein the crossover location between said auxiliary X address line and said main X address line is located outside of said addressable area and wherein the crossover location between said auxiliary Y address line and said main Y address line is also outside of said addressable area.

* * * * *